US010739762B2

(12) United States Patent
Fitzgibbon (10) Patent No.: US 10,739,762 B2
(45) Date of Patent: *Aug. 11, 2020

(54) REMOTELY OPERATING A MOVABLE BARRIER OPERATOR WITH AUXILIARY DEVICE (71) Applicant: The Chamberlain Group, Inc., Oak Brook, IL (US)

(72) Inventor: James J. Fitzgibbon, Batavia, IL (US)

(73) Assignee: The Chamberlain Group, Inc., Oak Brook, IL (US)

(*) Notice: Subject to any disclaimer, the term of this patent is extended or adjusted under 35 U.S.C. 154(b) by 62 days.

This patent is subject to a terminal disclaimer.

(21) Appl. No.: 16/174,695

(22) Filed: Oct. 30, 2018

(65) Prior Publication Data
US 2019/0064783 A1 Feb. 28, 2019

Related U.S. Application Data (63) Continuation of application No. 14/087,741, filed on Nov. 22, 2013, now Pat. No. 10,126,737.

(51) Int. Cl.
G05B 19/418 (2006.01)
E05F 15/77 (2015.01)
E05F 15/668 (2015.01)

(52) U.S. Cl.
CPC ........ G05B 19/41855 (2013.01); E05F 15/77 (2015.01); E05F 15/668 (2015.01);
(Continued)

(58) Field of Classification Search
CPC .. G05B 19/41855; E05F 15/77; E05F 15/668; E05Y 2900/106; E05Y 2400/66; E05Y 2400/664; E05Y 2400/80; E05Y 2400/86
See application file for complete search history.

(56) References Cited

U.S. PATENT DOCUMENTS 6,917,801 B2 7/2005 Witte
6,998,977 B2 2/2006 Gregori
(Continued)

FOREIGN PATENT DOCUMENTS

WO 2006053040 5/2006
WO 2013067569 5/2013

OTHER PUBLICATIONS

Australian Patent Application No. 2014353222; Examination Report No. 1; dated: Apr. 16, 2018.
(Continued)

Primary Examiner — Thomas C Lee
Assistant Examiner — Charles Cai
(74) Attorney, Agent, or Firm — Fitch Even Tabin & Flannery LLP (57) ABSTRACT An apparatus for use with an auxiliary device for commanding a movable barrier operator, the apparatus having a first communication interface, a processor device, and a second communication interface. The first communication interface being configured to receive a status change request from the auxiliary device. The processor device runs a movable barrier controller application and is configured to generate a control signal for the movable barrier operator in response to receiving the status change request. The second communication interface is configured to send the control signal to the movable barrier operator through a network.

31 Claims, 3 Drawing Sheets (52) U.S. Cl.
CPC ..... *E05Y 2400/66* (2013.01); *E05Y 2400/664* (2013.01); *E05Y 2400/80* (2013.01); *E05Y 2400/86* (2013.01); *E05Y 2900/106* (2013.01)

(56) References Cited

U.S. PATENT DOCUMENTS

| | | | |
|---|---|---|---|
| 7,124,943 | B2 | 10/2006 | Quan |
| 7,197,278 | B2 | 3/2007 | Harwood |
| 7,970,446 | B2 | 6/2011 | Witkowski |
| 8,581,696 | B2 | 11/2013 | Ghabra |
| 8,634,888 | B2 | 1/2014 | Witkowski |
| 8,761,712 | B1 | 6/2014 | Howard |
| 8,897,708 | B2 | 11/2014 | Witkowski |
| 9,715,772 | B2 | 7/2017 | Bauer |
| 2002/0183008 | A1 | 12/2002 | Menard |
| 2003/0228879 | A1 | 12/2003 | Witkowski |
| 2006/0038656 | A1 | 2/2006 | Wilson |
| 2006/0103503 | A1 | 5/2006 | Rodriquez |
| 2006/0132284 | A1 | 6/2006 | Murphy |
| 2007/0046428 | A1 | 3/2007 | Mamaloukas |
| 2007/0290793 | A1 | 12/2007 | Tran |
| 2008/0061926 | A1 | 3/2008 | Strait |
| 2008/0169899 | A1* | 7/2008 | Bauman ............... B60R 25/257 340/5.23 |
| 2008/0224886 | A1 | 9/2008 | Rodriguez et al. |
| 2008/0291047 | A1 | 11/2008 | Summerford |
| 2010/0201482 | A1 | 8/2010 | Robertson |
| 2010/0289661 | A1 | 11/2010 | Styers |
| 2011/0311052 | A1 | 12/2011 | Myers |
| 2012/0249289 | A1 | 10/2012 | Freese |
| 2013/0326595 | A1* | 12/2013 | Myers ............... G07C 9/00174 726/4 |
| 2014/0091900 | A1 | 4/2014 | Kohlenberg |
| 2014/0125453 | A1 | 5/2014 | McIntyre |
| 2014/0171032 | A1 | 6/2014 | Huang |
| 2014/0320263 | A1* | 10/2014 | Fan ............... E05F 15/77 340/5.71 |
| 2015/0061828 | A1 | 3/2015 | Fischer |
| 2015/0137941 | A1* | 5/2015 | Bauer ............... G07C 9/00182 340/5.61 |
| 2017/0323498 | A1 | 11/2017 | Bauer |

OTHER PUBLICATIONS

Chamberlain—Introducing the LiftMaster Internet Gateway; http://www.liftmaster.com/lmcv2/products/introducingliftmasterinternetgateway.htm; accessed Nov. 15, 2013.
Chamberlain MyQ Internet Connectivity Kit; Model: CIGCWC; Smartphone Internet Garage Door Opener Kit; http://www.chamberlain.com/smartphone-control-products/smartphone-connectivity/myq-internet-connectivity_kit.htm accessed Nov. 13, 2013; product available as early as Dec. 2012.
Chamberlain MyQ Internet Gateway; Model: CIGBU; Smartphone Internet Garage Door Opener -MyQ; http://www.chamberlain.com/smartphone-control-products/smartphone-connectivity/myq-internet-gateway.htm; accessed Nov. 13, 2013; product available as early as Sep. 2011.
European Application No. 14864870.2; Communication Pursuant to Article 94(3) EPC, dated Jun. 20, 2018.
European Application No. 14864870.2; Extended European Search Report dated Jun. 16, 2017.
International Preliminary Report on Patentability for PCT Patent Application No. PCT/US2014/066132; dated Jun. 2, 2016.
International Search Report and Written Opinion from PCT/US2014/066132 dated Dec. 18, 2014.
European Application No. 14864870.2; Communication Pursuant to Article 94(3) EPC; dated Mar. 8, 2019.
European Application No. 14864870.2; Communication Pursuant to Article 94(3) EPC; dated Nov. 4, 2019.

* cited by examiner

FIG. 1

FIG. 2

REMOTELY OPERATING A MOVABLE BARRIER OPERATOR WITH AUXILIARY DEVICE

RELATED APPLICATION(S)

This is a continuation of U.S. patent application Ser. No. 14/087,741, filed Nov. 22, 2013, now U.S. Pat. No. 10,126,737, entitled Remotely Operating A Movable Barrier Operator With Auxiliary Device, which is incorporated by reference in its entirety herein.

TECHNICAL FIELD

The present invention relates generally to moveable barrier operators, and more specifically to remotely operating a movable barrier operators with an auxiliary device communicating with a host device.

BACKGROUND

Various remotely controllable access control mechanisms are known, including barrier movement operators for movable barriers including, but not limited to, single and segmented garage doors, pivoting and sliding doors and crossarms, rolling shutters, and the like. In general, each such system includes a primary barrier control mechanism coupled to a corresponding barrier configured to move the barrier (typically between closed and opened positions). A Radio Frequency ("RF") transmitter is typically utilized to remotely control a garage door opener for opening and closing a garage door. The RF transmitter is often located within an automobile and an RF control signal may be transmitted to the garage door opener in response to, for example, pressing a button on the RF transmitter.

More recently, systems have been implemented to allow a user to remotely control a movable barrier operator through a network connection. In such cases, the movable barrier operator is often times controlled by a networked device that also performs various other functions. For example, the networked device may be an internet-enabled mobile computer running various applications. A problem arises when a user needs to navigate through various screens of the networked device to access the controls for operating the movable barrier operator while engaged in other activities. For example, a user may need to open a web browser, type in a web address, and enter log-in information before the user can access the controls for operating the movable barrier operator. This is inconvenient and potentially dangerous, especially if the user is also driving. Operating such devices behind the wheels may also be illegal in several States. There is also no convenient way to see whether the movable barrier is open or close without having to similarly navigate through the networked device.

SUMMARY

Methods and systems for controlling a movable barrier operator are described wherein. The system includes an auxiliary device and a networked host device that can communicate with a movable barrier operator through a network connection. For example, the system may include a Smartphone running a garage door controller app and a separate remote control device that communicates with the Smartphone. When a user presses a button on the remote control device, the remote control device sends a signal to the Smartphone through short-range radio frequencies such as Bluetooth®. The garage door controller application installed Smartphone then sends a control signal to a designated movable barrier operator over a network, such as the Internet, to cause the garage door to open or close.

Such a system provides a dedicated remote control device that can be easily accessed and operated by a user, much like the conventional Radio Frequency (RF) transmitter remote controllers. That is, a driver can simply reach for the remote control device and press a button to operate the garage door without having the take his eyes off the road. This system also provides added benefits of controlling a movable barrier operator over a network that is not present in convention RF transmitters. First, the remote control device can control a movable barrier from anywhere with a network connection. Furthermore, in some embodiments, a remote control device coupled with a networked host device has the added ability to receive information relating to the status of the movable barrier. For example, the remote control may include a status indicator for indicating whether a garage door is opened or closed. A user can view this information without having to navigate through the screens on the Smartphone. In some embodiments, the app running on the host device may be configured to control different barrier operators and select which barrier to open or close based on the location of the host device. For example, when a user presses a button on the remote control device, the host device may open either a community gate or a house garage door depending on the user's proximity to these movable barriers. This function can reduce the number of remote control devices that a user needs to carry around. Additionally, the system also provides an added layer of security to the remote control device. The system allows the security information needed to operate a movable barrier operator to be only stored on the host device. If the remote is misplaced or stolen, the remote control will not be able to open a movable barrier on its own. These and other benefits may be clearer upon making a thorough review and study of following detailed description.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will be further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
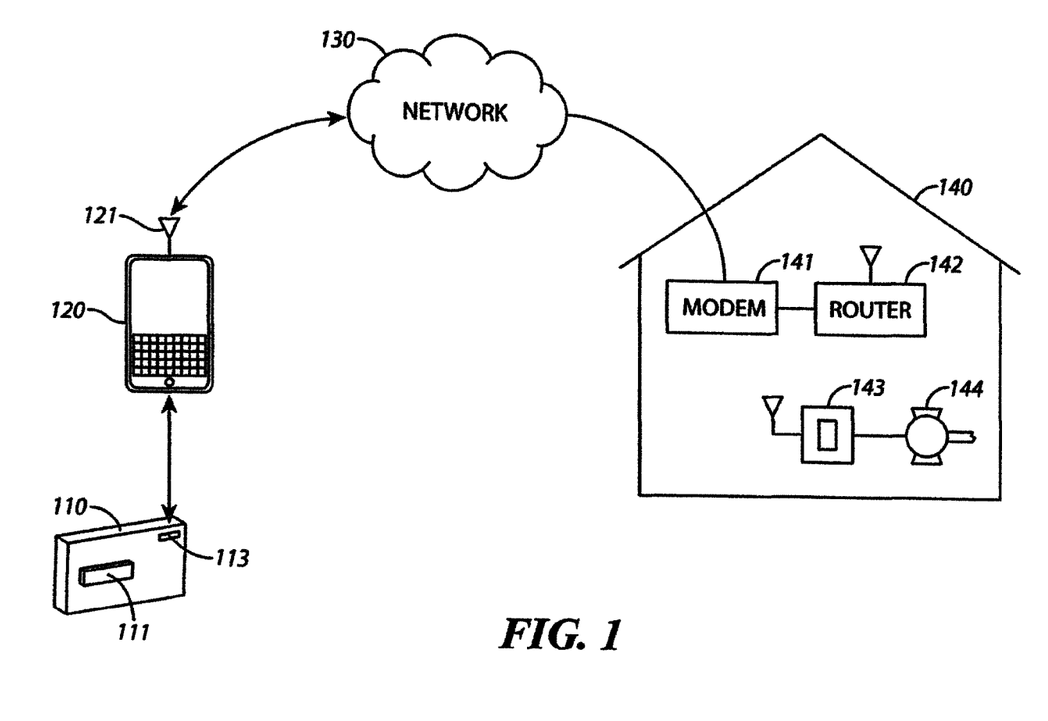
FIG. 1 comprises a block diagram illustrating a system comprising various components for operating a movable barrier in accordance with one or more embodiments of the invention.

Referring first to FIG. 1, an example system comprising components and apparatuses for operating a movable barrier is shown. The system shown in FIG. 1 includes an auxiliary device 110, a host device 120, a network 130, a modem 141, and a movable barrier operator 143.

The auxiliary device 110 may be short range transmitter device configured for mounting in a vehicle. For example, the auxiliary device 110 may be a dedicated remote control including having a button 111 and a status indicator 113. In some embodiments, the auxiliary device 110 may be similar in appearance to a conventional radio frequency (RF) garage door opener. In some embodiments, the auxiliary device may be part of a built-in vehicle electronics system. The auxiliary device 110 may include wireless communication interface configured to send short range wireless communication signals to the host device 120. The short-range signal may be, for example, Bluetooth, infrared, Wi-Fi, and the like. In some embodiments, short-range communication signals are signals limited to 25-100 mW effective radiated power (ERP) or less so that the communication range is approximately limited to being within a given vehicle. Additional details of an auxiliary device are described with reference to FIG. 2 below.

The host device 120 may be a network-enabled electronic device such as a Smartphone, a mobile communication device, a tablet computer, a wearable computer, an infotainment system, a telematics system, a personal computer, a dash computer, a dedicated computer platform, a navigation system, and an intelligent transportation system. In some embodiments, the host device 120 is a multi-functional device such as a Smartphone configured to run one or more applications, such as mapping application, email application, music player application, internet browser application, and the like. The host device 120 may include movable barrier controller software that is configured to send a command to the movable barrier operator 143 in response to receiving a signal from the auxiliary device 110. For example, the software may be a downloaded movable barrier controller application installed on a Smartphone. In some embodiments, the movable barrier controller software also provides a user interface on the host device 120 that allows the user to control and/or monitor one or more movable barriers through the display and input devices of the host device 120. The host device also includes a network interface 121 for communicating with the network 130. Additional details of a host device are described with reference to FIG. 2 below.

The network 130 is a data communication network which may be, for example, the Internet. While not shown, it is understood that the network 130 may include various components such as routers, transmission towers, servers, and the like for relaying the communication between the home network modem 141 and the host device 120. The network 130 may further include a barrier operator server (not shown), which processes the data received from the host device prior to sending the data to the movable barrier operator. For example, in some embodiments, the host device sends a message to the barrier operator server with only an identification number of a movable barrier operator and/or the user, and the server routes the message to the movable barrier with the information relating to that movable barrier operator stored on the server. In some embodiments, the message may be stored on the server until the movable barrier operator queries the server for messages. In some embodiments, a dedicated barrier operator server is not needed and the message may be sent through other types of communication server. For example, the host device 120 may send a text message to a phone number or an email to an email address monitored by the movable barrier operator using the text message and email servers respectively.

A local network is represented by a house 140 in FIG. 1; however, it is understood that the components shown as being in the house 140 need not be physically located in a residence. The modem 141 is connected to the network 130 to receive messages from the host device 120 through the network 130. The message may be a command to operate the movable barrier operator 143 or a query for the status of the movable barrier (not shown). The message is routed through the local network router 142 to the network enabled movable barrier operator 143.

The movable barrier operator 143 may be a garage door operator, a gate operator, a commercial door operator, an arm barrier operator and the like. FIG. 1 also shows the movable barrier operator being coupled to a motor 144 for actuating a movable barrier. While FIG. 1 shows that the router 142 and the movable barrier operator 143 communicating wirelessly, it is understood that the connection may also be wired. Additionally, in some embodiments, the movable barrier operator 143 may directly communicate with the network without the modem 141 and router 142. For example, the movable barrier operator 143 may be a network enabled device configured to directly access the cellular, mobile data, or other types of wireless network.

While FIG. 1 illustrates the host device 120 and the auxiliary device 110 as being outside of the house 140, it should be understood that the system is also configured to operate with the host device 120 and the auxiliary device 110 near or inside the house 140. The host device 120 and the auxiliary device 110 may be located in or near a vehicle. In some embodiments, the auxiliary device 110 only includes a Bluetooth transceiver and has to be paired with a host device to operate the movable barrier operator 143. In other embodiments, the movable barrier operator 143 is configured to receive signal directly from the auxiliary device 110 in case the host device 120 is not available. For example, the auxiliary device may be equipped with both a Bluetooth transceiver (2400-2483.5 MHz) and a 200 MHz to 400 MHz transmitter, a frequency compatible with conventional garage door openers (GDO). In some embodiments, the auxiliary device 110 may transmit both a Bluetooth signal to the host device 120 and a RF signal directly receivable by the movable barrier operator 143 when the user pushes the button 111. In some embodiments, a user can selectively configure the auxiliary device 110 to transmit one or both of a Bluetooth signal and a GDO signal. For example, the auxiliary device 120 may include a switch for enabling and disabling GDO signal transmission. In some embodiments, the user can also configure the auxiliary device 120 with a Bluetooth transmitter to only transmit a GDO signal, thus functioning essentially as a conventional GDO. In some embodiments, the information required to transmit the GDO signal is stored on a local memory of the auxiliary device 120. In some embodiments, the auxiliary device 120 is configured to obtain and/or update the information required to transmit a GDO signal from the host device 120.

The movable barrier operator 143 may be configured to respond to status change requests received through the network and through a 200 MHz to 400 MHz RF receiver. In some embodiments, the movable barrier operator 143 may be configured by a user to respond only to status change requests from the network or from the RF receiver. For example, if a GDO remote is misplaced, a user can disable the movable barrier operator's GDO receiver with either a networked device or a switch on the movable barrier operator 143, and still operate the movable barrier with an authorized networked device.

While only one host device 120, one auxiliary device 110, and one movable barrier operator 143 are shown in FIG. 1, in some embodiments each auxiliary device may be configured to communicate with multiple host devices, each host device may be configured to communicate with multiple auxiliary devices, and each movable barrier operator may be configured to receive message from multiple host devices.

The system shown in FIG. 1 allows the auxiliary device 110 to operate the movable barrier operator 143 at any location that the host device 120 can directly or indirectly access over the network 130. The auxiliary device 110 also removes the need for a user to navigate through various menus and options of the host device 120 to access the interface that allows the user to remotely control a movable barrier operator. For example, the auxiliary device 110 may be clipped to a vehicle visor and a driver can reach for and press the button 111 on the auxiliary device 110 without taking his eyes off the road. A drive can also quickly glance over to the auxiliary device to check the status of the movable barrier operator displayed on the status indicator 113 to make sure the garage door is closed.

Figure 2:
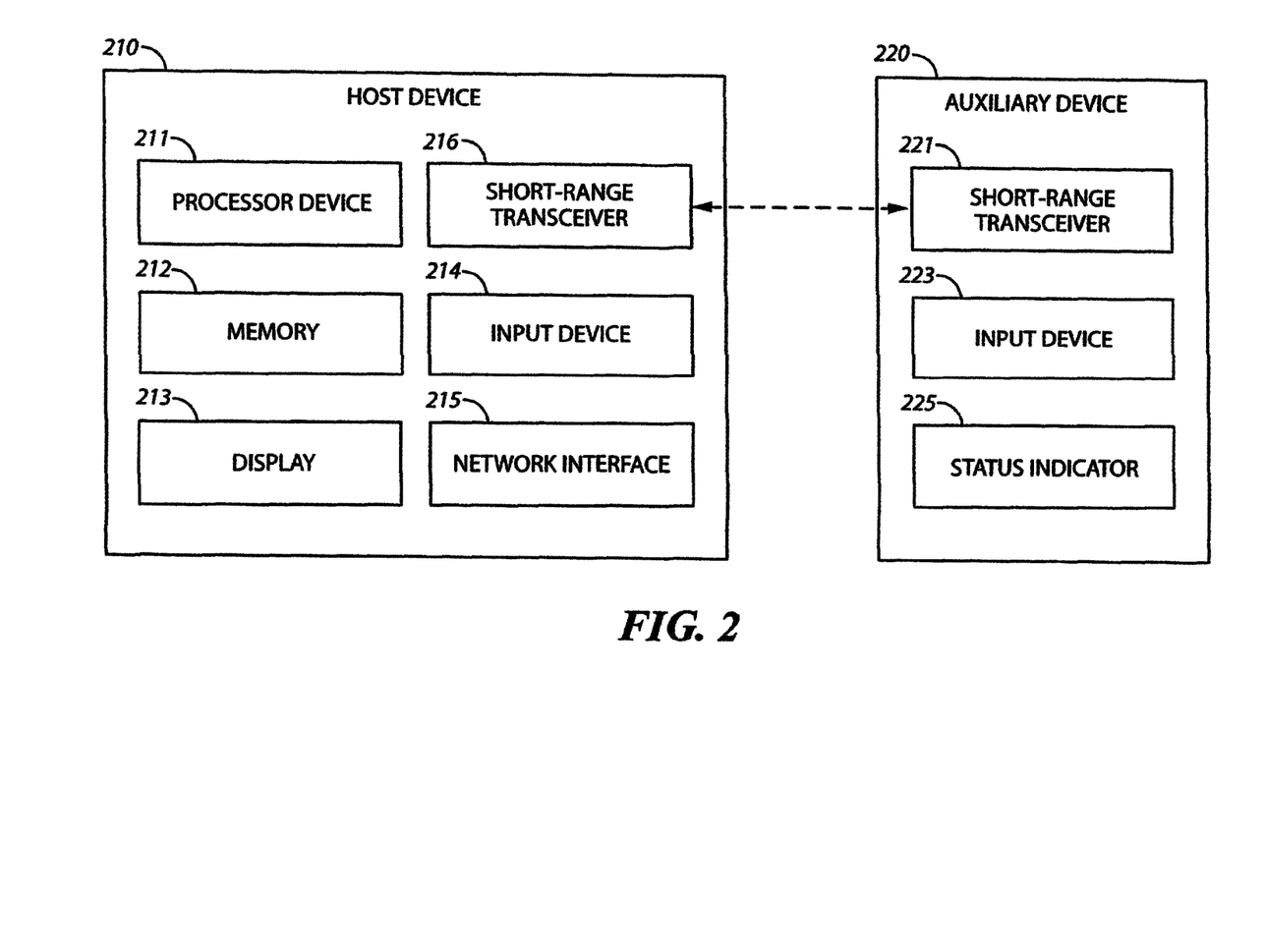
FIG. 2 comprises a block diagram of a host device and an auxiliary device in accordance with one or more embodiments of the invention.

Next referring to FIG. 2, a paired set of host device 210 and auxiliary device 220 is shown. The host device 210 includes a processor device 211, a memory 212, a display 213, input device 214, a network interface 215, and a short-range transceiver 216. The host device 210 may be a network-enabled electronic device such as a Smartphone, a tablet computer, a wearable computer, an infotainment system, a telematics system, a personal computer, a dash computer, a dedicated computer platform, a navigation system, and an intelligent transportation system.

The memory 212 may include one or more of a hard disk, solid state drive, RAM, and other types of non-transitory storage memory. For example, the memory 212 may include one or more of the built-in mass storage, on-board RAM, inserted SD memory card, and SIM card memory of a Smartphone device. The memory 212 may store a number of software programs or apps executable by the processor device 211, including a movable barrier operator controller program. The movable barrier controller program is configured to communicate with one or more movable barrier operators to operate the movable barrier and/or to receive status indication. The movable barrier operator controller program may include its own user interface to allow a user to operate a movable barrier operator with the host device. The movable barrier controller program may further include a user interface to allow a user to configure various settings associated with the operation of movable barrier. For example, the user interface may allow the user to associate the host device 210 with one or more auxiliary devices 220 and/or one or more movable barrier operators. In some embodiments, the user setting is also stored on the memory 212; in other embodiments, the user setting is stored on a movable barrier operator server in the data cloud. In some embodiments, the movable barrier program includes a background process that monitors for signals from the auxiliary device 220, a movable barrier operator, and/or a server. In some embodiments, the memory 212 also stores an operating system, such as Windows®, iOS®, Android™, BlackBerry® OS, and the like. The memory 212 may also store authentication information of auxiliary device(s) that had been paired with the host device 210. The memory may further store information of associated movable barrier operator(s) needed to send messages and commands to the movable barrier operator(s).

The display 213 may be any type of known displays, such as liquid crystal display (LCD), light emitting diode (LED) display, organic light emitting diode (OLED) display, E-Paper, and the like. The display 213 may be build-in screen incorporated with a vehicle's telematic system. The display 213 is configured to display the user interface of the various operating system and/or program executed by the processor device 211.

The input device 214 may be any type of known user input devices including a touch screen, a touch pad, a keypad, a keyboard, one or more buttons, a microphone, a camera, a joystick, and the like. The input device 214 allows the user to interface with various programs executed by the processor device 211. In some embodiments, the display 213 and the input device 214 are integrated in the form of a touch screen device.

The network interface 215 is a communication interface that allows the host device 21 to connect to a network. The network interface 215 may include one or more of a cellular network transceiver, a Wi-Fi modem, a wireless broadband modem, a mobile data network modem and the like. The network interface 215 may be configured to connect to the internet and/or a private network to communicate with a movable barrier operator and/or a server.

The short-range transceiver 216 may be short-range radio frequency communication interface. For example, the short-range transceiver may include a low-power transmitter with less than 100 mW effective radiated power (ERP), depending on the frequency band, which limits their useful range to few hundred meters, and do not require a license from its user. For example, in some embodiments, the short-range transceiver 216 may be a Bluetooth® transceiver which operates in the range of 2400-2483.5 MHz. The host device 210 may communicate with one or more devices through the short-range transceiver 216.

The host device 210 may further include a location determination function such as a global positioning system (GPS) receiver (not shown) and/or other types of sensors such as motion sensor, accelerometer, microphone, camera, and the like. In some embodiments, one host device may be associated with multiple movable barrier operators. The movable barrier operator controller software on the host device 210 may select a movable barrier operator to control based on the proximity of the host device to the movable barrier operators using the host device's location determination function, such as receipt of a GPS signal, receipt of a WiFi signal, triangulation via communication with multiple other antennas, and the like. For example, the software may determine the host device's location and compare that information with stored information regarding the locations of certain movable barrier operators as may be programmed by a user. In this manner, the host device can determine which movable barrier operator is the closest to the current location of the host device, and sends the message to the closest movable barrier operator.

The auxiliary device 220 includes a short-range transceiver 221, an input device 223, and a status indicator 225. The auxiliary device 220 may be a short-range transmitter and may be a dedicated movable barrier operator controller device. In some embodiments, the auxiliary device may be similar in dimensions and appearance to a conventional garage door remote control. In other embodiments, the auxiliary device may be integrated with other devices, such as a vehicle on-board electronics system.

The short-range transceiver 221 of the auxiliary device 220 may be similar to the short-range transceiver 216 of the host device 210. The short-range transceiver 221 provides a way for the auxiliary device 220 to communicate with the host device 210. The input device 223 may be any type of common input means including a the user input device comprises at least one of a button, a capacitance input, a touch screen, a switch, a microphone, and a motion sensor. The input device 223 allows a user to cause the auxiliary device 220 to send a signal to the host device 210 to request a status change on the movable barrier. For example, a user may press a button on the auxiliary device 220 to open or close a garage door through the host device 210. In some embodiments, the input device 223 may allow the user to specify whether the desired status is open or closed. In some embodiments, the auxiliary device 220 may include multiple buttons, each pre-programmed for a different movable barrier operator. The signal from the auxiliary device 220 to the host device 210 may then include information associated with which button is pushed.

The status indicator 225 may be any type of display that can indicate at least two statuses (e.g. open or close). For example, the status indicator may be an LED bulb(s), an LED array, an LCD display, a bistable display, and the like. The status indicator may also include one or more of a light producing device, a light emitting diode, a video display, a liquid crystal display, a touch screen display, and a sound producing device. The auxiliary device 220 may be configured to receive movable barrier status information from the host device 210 and display the status of the movable barrier (e.g., open or closed) through the status indicator 225. The movable barrier status information may be information related to the position and/or movement of a movable barrier such as open, close, moving, opening, closing, locked, unlocked, connected, disconnected, and the like. In some embodiments, the status indicator may be configured to display the status of multiple movable barriers. For example, in an embodiment of the auxiliary device 220 having multiple inputs associated with multiple movable barriers, a status indicator may be associated with each of the multiple inputs. In some embodiments, the status indicator constantly displays the status of movable barrier(s). In other embodiments, a user can use an input device 223 to trigger the display of status on the status indicator. In some embodiments, the status indicator 225 is only turned on in specific statuses and is off in other statuses. For example, a LED light may only be lit when a garage door is open, and is turned off when the garage door is closed.

While the auxiliary device 220 is shown with three components in FIG. 2, it is understood that the auxiliary device may include additional components. For example, the auxiliary device 220 may include a housing enclosing the short range transceiver 221, the input device 223, and the status indicator 225. The auxiliary device may further include means for attaching the auxiliary device 220 to another structure. The attachment means may be a clip, a clap, a hook and loop strip, a suction cup, and the like. The auxiliary 220 device may also include an independent power source such as a battery. The auxiliary device 220 may further include a memory for storing authentication information of the host device(s) with which it had previously authenticated.

In other embodiments, an auxiliary device 220 may not include a status indicator 225. The transceivers 221 may be a transmitters instead. That is, the auxiliary device 220 may only be configured to send status change requests but does not receive the movable barrier status information. For example, a conventional garage door opener may be paired with a RF receiver coupled to the host device 210 to allow the convention garage door opener to operate a movable barrier remotely through a network consistent with the descriptions herein.

In some embodiments, the auxiliary device 220 may include a short-range transmitter, such as a GDO transmitter, in addition to the short-range transceiver 221. When a user actuates the input device 223, the auxiliary device may transmit a GDO signal through the GDO transmitter in addition to transmitting the short-range signal through the short-range transceiver 221. In some embodiments, the auxiliary deceive further includes one or more switches for enabling and disabling the GDO transmitter and/or the short-range transceiver 221. For example, a user may place the switch in one position to transmit both a GDO signal and a Bluetooth signal, and move the switch to a second position to transmit only a Bluetooth signal. In some embodiments, the transmitter/transceiver may be configured through the host device 210. For example, movable operator controller application on the host device 210 may allow the user to enable and disable the GDO transmitter on the auxiliary device 220. In some embodiments, the movable operator controller allows the user to configure whether to send a GDO transmitter and/or a Bluetooth signal based on the movable barrier operator being operated by the signal. In some embodiments, the short-range transceiver 221 and the GDO transmitter may respond to different user inputs. For example, different buttons may be associated with the short-range transceiver 221 and the GDO transmitter. The buttons may be configured to operate the same or different movable barrier operators.

Figure 3:
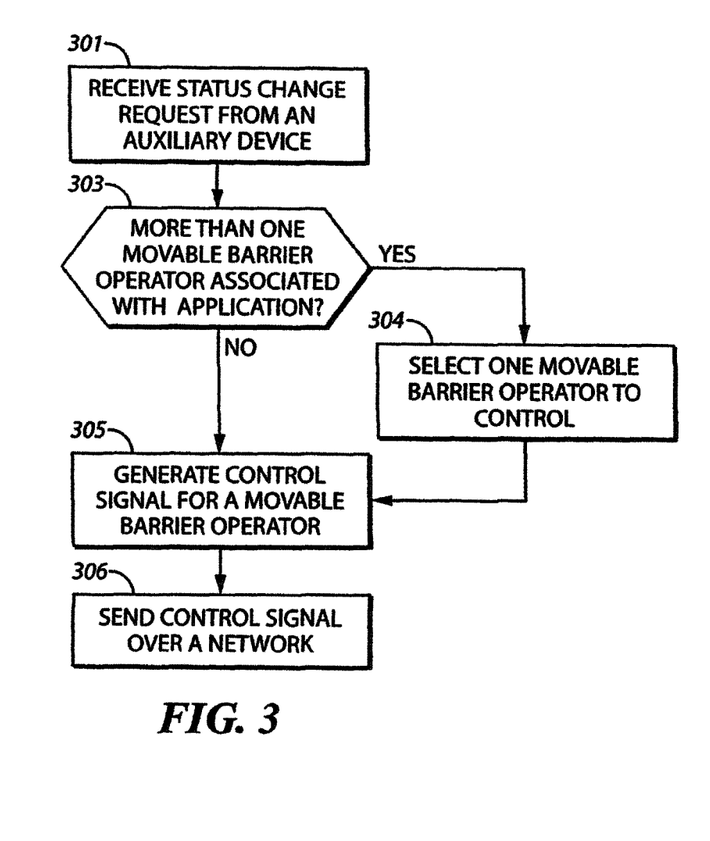
FIG. 3 comprises a flow diagram for an example method of remotely controlling a movable barrier operator with a host device in accordance with one or more embodiments of the invention.

FIG. 3 shows a flow diagram of an example method for remotely operating a movable barrier as implemented on a host deice. At step 301, the host device receives a status change request from an auxiliary device. The signal from the auxiliary device may be a simple trigger signal or it may specify whether the desired movable barrier status should be opened or closed. The signal may also indicate which of a plurality of movable barriers should receive the command to change status. The status change request may be received through a wireless or wired signal. In some embodiments, the status change request is a short-range radio frequency signal such as a Bluetooth® signal. At step 301, the host device may additionally verify the authentication status of the auxiliary device. For example, the host device may determine whether the auxiliary device sending the signal has permission to control the movable barrier operator. Step 301 may be a function of movable barrier operator application software, the operating system, and/or a background monitoring process running on the host device.

At step 303, the host device determines whether more than one movable barrier operator are associated with the application running on the host device. In some embodiments, one host device may have stored in its memory information relating to multiple movable barrier operators that it can communicate with and control. For example, one host device may be configured to control an office parking garage gate, a community gate, and a residential garage gate. If there are multiple movable barrier operators associated with the host device, the process moves to step 304. If only one movable barrier operator is associated with the application, the process may proceed directly to step 305. In some embodiments, the movable barrier controller application is only configured to communicate with one movable barrier operator, and both steps 303 and 304 may be skipped.

At step 304, the application selects one movable barrier operator to control. The selection may be based on one or more factors. In some embodiments, the user may select a default movable barrier operator for the host device. The default movable barrier operator may further be configured to automatically change based on time of day, date of week, location of the host device, etc. In some embodiments, the host device uses a GPS signal or other location determination to determine which movable barrier operator is the closest to the host device to select a movable barrier operator to control. In some embodiments, the signal from an auxiliary device causes the host display to display options and/or status for the multiple movable barrier operators on its display screen for the user to select. In some embodiments, one movable barrier operator is selected based the input received on the auxiliary device. For example, the auxiliary device may have separate buttons for the community gate and the residential garage door, and a different signal is sent to the host device based on which button is pressed. In some embodiments, the movable barrier operator is selected based on the identity of the auxiliary device sending the signal. For example, one auxiliary device may be configured to only control a first gate, and a second auxiliary may be configured to control a second gate. The host device may be configured to allow a user to select and edit one or more of the above configurations with a user interface of the movable barrier controller application, and determine a movable barrier operator based on the stored user configuration.

At step 305, the host device generates a control signal for a movable barrier operator. The control signal may be a status change request which opens the movable barrier if it is currently closed, and closes the movable barrier if it is currently open. In some embodiments, the control signal may specify whether the desired status is opened or closed such that the operator then determines whether to operate based on the received control signal and the current state of the barrier. In some embodiments, the control signal may include information necessary to establish that the host device has permission to change the status of the movable barrier operator. For example, the control signal may be encrypted with a passcode or include other encryption such as rolling code encryption.

At step 306, the control signal is sent over a network to the movable barrier operator. The control signal may be sent via a network interface of the host device such as a Wi-Fi module, a cellular data antenna, and the like. In some embodiments, the control signal may be sent in the form of a data packet, a text message, a voice call, or an email. In some embodiments, after step 306, the host device may receive a confirmation signal from the movable barrier operator through the network to confirm that the requested status change has been completed. In some embodiments, the confirmation signal may be barrier status information. In some embodiment, the control signal and/or the confirmation signal is routed through a server such as a dedicated movable barrier controller server.

In some embodiments, prior to step 301 of the method shown in FIG. 3, the host device may first be required to authenticate with one or more auxiliary devices. For example, a user may enter a pass code or device code associated with the auxiliary device on the host device for the host device to accept status change request signals from the auxiliary device in the future. Also prior to step 301, the host device may also authenticate with a movable barrier operator. For example, the user may be required to enter a pass code or the device code associated with the movable barrier operator for the host device to send control commands to the movable barrier operators. In some embodiments, the pass code or the device code may be encrypted into the control signal each time a message is sent between the various devices to ensure that only host devices with permission to operate the movable barrier operator can cause the movable barrier to move. In some embodiments, authentication may include the user logging into a movable operator server to access a user profile that may be associated with one or more movable barrier operator.

Additionally, prior to, during, and/or after the method shown in FIG. 3, the host device may further periodically query for movable barrier status from the movable barrier operator. In some embodiments, the movable barrier operator updates the information stored on a server when the status of the movable barrier changes, and the host device periodically retrieves the status information form the server.

Figure 4:
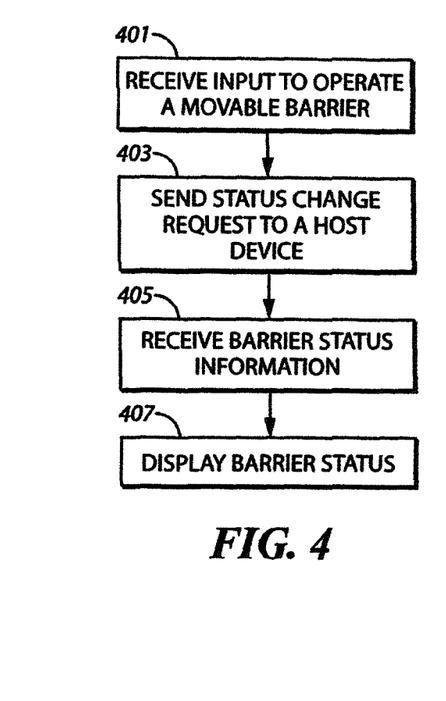
FIG. 4 comprises a flow diagram for an example method of remotely controlling a movable barrier operator with an auxiliary device in accordance with one or more embodiments of the invention.

FIG. 4 shows a flow diagram of a method for remotely operating a movable barrier as implemented on an auxiliary device. At step 401, the auxiliary device receives a user input to operate a moveable barrier. The user input may be a user operating an input device such as a button, a keypad, a touchpad, a switch, and the like on the auxiliary device. In some embodiments, the user input may also be a voice command, a gesture command, and the like.

At step 403, the auxiliary device sends a status change request to a host device. Step 403 occurs in response to step 401. The status change request may be sent through a previously established communication link with a host device. For example, the communication link may be a short-range radio frequency communication channel. In some embodiments, the status change request is broadcasted to all nearby devices. The status change request may be a trigger that requests a change from the current barrier status, whether the current status is opened or closed. In other embodiments, the status change request may specify whether the desired status is opened or closed. In some embodiments, the status change request may specify which movable barrier operator to control based on the user input in step 401. For example, the status change request may be based on which button the user pushes on the auxiliary device.

At step 405, the auxiliary device receives the barrier status information from the host device. Step 405 may occur after each time a status change request is sent to a host device in step 403. In some embodiments, the barrier status information also functions as a confirmation of the receipt of the status change request. Alternatively, prior to step 405, the host device may send a separate confirmation signal. In some embodiments, step 405 occurs periodically with or without steps 401 and 403. For example, the host device may automatically transmit the barrier status information to the auxiliary periodically, or the auxiliary device may request the barrier status information from the host device periodically. In some embodiments, the barrier status information is sent by the host device when the host device detected a change in the movable barrier status. In some embodiments, step 405 includes storing the received barrier status information on a memory on the auxiliary device. In some embodiments, the stored status memory may be used to determine whether the desired status is open or close when a user input is received in step 401. In another approach, no barrier status information is received at all by the auxiliary device, such information being available instead only from the host device.

At step 407, the barrier status is displayed on a status indicator of the auxiliary device. The status indicator may be LED bulb(s), a LED array, a LCD display, a bistable display, and the like. In some embodiments, the status indicator may display the status of multiple movable barriers. For example, in an embodiment of the auxiliary device having multiple inputs associated with multiple movable barriers, a status indicator may be associated with each of the multiple inputs. In some embodiments, the status indicator constantly displays the status of movable barrier(s). In other embodiments, a user can use an input device to trigger the display of status on the status indicator. The display of barrier status may be changed based on the barrier status information received in step 405.

The above approach combines the accessibility with a conventional remote control and the versatility of a networked movable barrier controller application. A driver can simply reach for the remote control device and press a button to operate the garage door without having the take his eyes off the road. This system also allows for various user configurable settings that can be tailored to each user's individual needs and usage pattern. The system also provides an added layer of security in case the remote control is misplaced or stolen. In such a case, the remote control will not be able to open a movable barrier on its own. The user can also revoke the authentication of the host and/or auxiliary device if one or both is lost through another networked device for added security.

Accordingly, the embodiments described above provide security to the owner of a garage door opener by removing the ability for a transmitter to function when it is distant from a vehicle in which it is normally used. By adding a secondary transmitter within the vehicle and requiring the primary transmitter to receive an identification signal from the secondary transmitter, the primary transmitter would have knowledge that it is close enough to the vehicle in order to activate the garage door opener to perform various functions.

Those skilled in the art will recognize that a wide variety of modifications, alterations, and combinations can be made with respect to the above described embodiments without departing from the scope of the invention. For example, any of the signals or commands sent or received by the host device, auxiliary device, and movable barrier operator may be encrypted according to various methods. Such modifications, alterations, and combinations are to be viewed as being within the ambit of the inventive concept.

What is claimed is:

1. An in-vehicle wireless wide area network device for use with a remote control device for controlling a movable barrier operator, the in-vehicle wireless wide area network device comprising:
   a first communication interface configured to receive a status change request originated from the remote control device;
   a processor device configured to:
      determine whether the remote control device, from which the status change request originated, has permission to control the movable barrier operator; and
      output a control signal for the movable barrier operator in response to the determination that the remote control device has permission to control the movable barrier operator and in response to receipt of the status change request; and
   a second communication interface configured to automatically send the control signal to the movable barrier operator through a wireless wide area network in response to output of the control signal by the processor device,
   the processor device further configured to:
      determine a location of the in-vehicle wireless wide area network device;
      select one of a plurality of movable barrier operators, wherein selection of the one of the plurality of movable barrier operators is based on one or more of a stored user configuration and a proximity of the plurality of movable barrier operators to the in-vehicle wireless wide area network device; and
      wherein the control signal is for the selected one of the plurality of movable barrier operators.

2. The in-vehicle wireless wide area network device of claim 1, wherein the status change request is received in response to an operation of a user input device of the remote control device.

3. The in-vehicle wireless wide area network device of claim 2, wherein the operation of the user input device of the remote control device is initiated by a voice command of a user.

4. The in-vehicle wireless wide area network device of claim 1, wherein the control signal is configured to cause the movable barrier operator to move a movable barrier coupled to the movable barrier operator.

5. The in-vehicle wireless wide area network device of claim 1, wherein the processor device is further configured to receive movable barrier status information from the movable barrier operator through the wireless wide area network.

6. The in-vehicle wireless wide area network device of claim 5, wherein the processor device is further configured to provide the movable barrier status information to the remote control device through the first communication interface to cause the remote control device to indicate a status of the movable barrier via an indicator of the remote control device.

7. The in-vehicle wireless wide area network device of claim 1, wherein the first communication interface comprises a short-range radio frequency communication interface.

8. The in-vehicle wireless wide area network device of claim 7, wherein the short-range radio frequency communication interface is configured to transmit and receive signals selected from the group consisting of Bluetooth, infrared, and Wi-Fi.

9. The in-vehicle wireless wide area network device of claim 1, wherein the processor device is further configured to authenticate the status change request received from the remote control device prior to outputting the control signal.

10. The in-vehicle wireless wide area network device of claim 1, wherein the in-vehicle wireless wide area network device is selected from the group consisting of an infotainment system, a telematics system, a dashboard touchscreen device, and a navigation device.

11. The in-vehicle wireless wide area network device of claim 1, wherein the remote control device comprises an input device that is integral with a vehicle, and the in-vehicle wireless wide area network device is in the vehicle.

12. A non-transitory computer readable medium including instructions which, when executed, cause performance of a method by a wireless wide area network device for controlling a movable barrier operator, the non-transitory computer readable medium comprising:
    first instructions for causing the wireless wide area network device to receive through a first communication interface a short range wireless communication signal in the form of a status change request originated from a remote control device;
    second instructions for causing the wireless wide area network device to determine whether the remote control device which originated the status change request has permission to control the movable barrier operator;
    third instructions for causing the wireless wide area network device to output a control signal for the movable barrier operator in response to determination that the remote control device has permission to control the movable barrier operator and in response to receipt of the status change request; fourth instructions for causing the wireless wide area network device to automatically send the control signal to the movable barrier operator over a long-range network through a second communication interface of the wireless wide area network device; and
    fifth instructions for causing the wireless wide area network device to:
        determine a location of the wireless wide area network device;
        select one of a plurality of movable barrier operators, wherein selection of the one of the plurality of movable barrier operators is based on one or more of a stored user configuration and a proximity of the plurality of movable barrier operators to the wireless wide area network device; and
    wherein the control signal is for the selected one of the plurality of movable barrier operators.

13. The non-transitory computer readable medium of claim 12, wherein the status change request is received in response to an operation of a user input device of the remote control device.

14. The non-transitory computer readable medium of claim 12, further comprising: sixth instructions for causing the wireless wide area network device to receive movable barrier status information from the movable barrier operator through the long-range network.

15. The non-transitory computer readable medium of claim 14, wherein the sixth instructions further cause the wireless wide area network device to:
    provide movable barrier status information to the remote control device through the first communication interface; and
    cause the remote control device to indicate the status of the movable barrier via an indicator of the remote control device.

16. The non-transitory computer readable medium of claim 12, wherein the first communication interface comprises a short-range radio frequency communication interface.

17. The non-transitory computer readable medium of claim 16, wherein the short-range radio frequency communication interface is configured to transmit and receive signals selected from the group consisting of Bluetooth, infrared, and Wi-Fi.

18. The non-transitory computer readable medium of claim 12, further comprising sixth instructions for causing the wireless wide area network device to authenticate the status change request received from the remote control device prior to causing the wireless wide area network device to send the control signal to the movable barrier operator.

19. The non-transitory computer readable medium of claim 12, wherein the status change request is received in response to a user input device of the remote control receiving a voice command of a user.

20. The non-transitory computer readable medium of claim 12, wherein the wireless wide area network device is selected from the group consisting of an in-vehicle infotainment system, a telematics system, a dashboard touchscreen device, and a navigation device.

21. An auxiliary device for use with an in-vehicle device for controlling a movable barrier operator, the auxiliary device comprising:
    a first communication interface configured to communicate with the in-vehicle device via a short-range wireless communication signal, wherein the in-vehicle device executes a movable barrier controller application configured to send a status change request to the auxiliary device via the first communication interface in response to actuation of a user input device of the in-vehicle device;
    a processor device configured to output a control signal for the movable barrier operator in response to determination that the in-vehicle device, from which the status change request originated, has permission to control the movable barrier operator and in response to receipt of the status change request; and
    a second communication interface configured to automatically send the control signal to the movable barrier operator in response to output of the control signal by the processor device,.
    wherein the control signal is selected for the movable barrier operator from a plurality of movable barrier operators based on one or more of a stored user configuration and a proximity of the in-vehicle device to the plurality of movable barrier operators.

22. The auxiliary device of claim 21, wherein the second communication interface is a 200 MHz-400 MHz radio frequency transmitter for sending the control signal to the movable barrier operator.

23. The auxiliary device of claim 21, wherein the first communication interface is configured to communicate with the in-vehicle device, wherein the in-vehicle device is configured to send the status change request in response to the actuation of the user input device by a voice command of a user.

24. The auxiliary device of claim 21, wherein the control signal is configured to cause the movable barrier operator to move a movable barrier coupled to the movable barrier operator.

25. The auxiliary device of claim 21, further comprising a user input device configured to be manipulated by a user and cause the second communication interface to send a second control signal to the movable barrier operator for operating the movable barrier operator.

26. The auxiliary device of claim 21, further comprising an indicator configured to indicate a status of the movable barrier.

27. The auxiliary device of claim 21, wherein the first communication interface is configured to transmit and receive signals via at least one of Bluetooth, infrared or Wi-Fi.

28. The auxiliary device of claim 21, further comprising an input device that is integral with a vehicle.

29. The auxiliary device of claim 21, wherein the in-vehicle device is at least one of an in-vehicle infotainment system, a telematics system, a dashboard touchscreen device, or a navigation device.

30. The non-transitory computer readable medium of claim 12, wherein the control signal is configured to cause the movable barrier operator to move a movable barrier coupled to the movable barrier operator.

31. The non-transitory computer readable medium of claim 12, wherein the remote control device comprises an input device that is integral with a vehicle, and the in-vehicle wireless wide area network device is in the vehicle.

* * * * *

UNITED STATES PATENT AND TRADEMARK OFFICE
CERTIFICATE OF CORRECTION

PATENT NO. : 10,739,762 B2
APPLICATION NO. : 16/174695
DATED : August 11, 2020
INVENTOR(S) : James J. Fitzgibbon Page 1 of 1

It is certified that error appears in the above-identified patent and that said Letters Patent is hereby corrected as shown below:

In the Claims

Column 14, Line 62, in Claim 21: delete "device,." and insert -- device, --, therefor.

Signed and Sealed this
Eighth Day of December, 2020

Andrei Iancu
*Director of the United States Patent and Trademark Office*